April 8, 1958     S. W. SAM     2,829,416
SNAP FASTENER
Filed Nov. 25, 1955
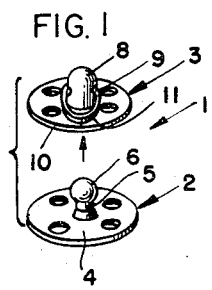
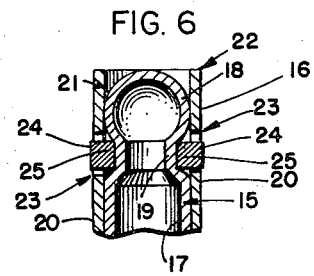
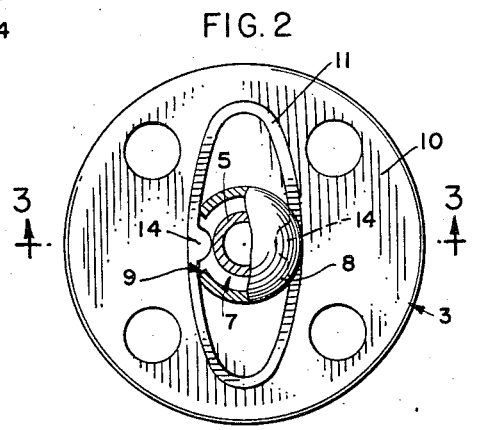
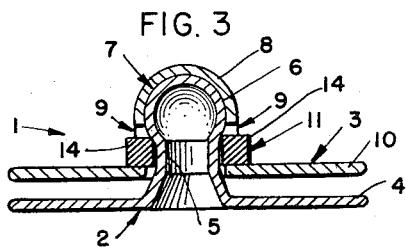
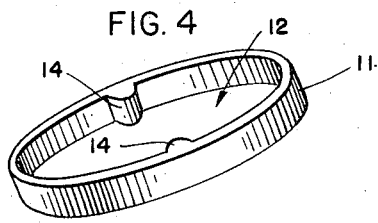
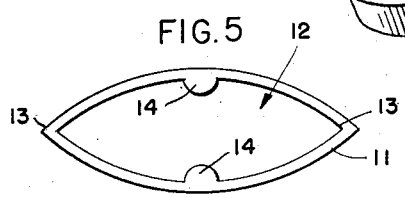

United States Patent Office 2,829,416
Patented Apr. 8, 1958

2,829,416

SNAP FASTENER

Sam W. Sam, Chicago, Ill.

Application November 25, 1955, Serial No. 549,003

1 Claim. (Cl. 24—217)

This invention relates to a snap fastener of the type wherein one element employs a socket or a female member cooperating with another element or male member having a protuberance.

The invention comprises in general a snap fastener which includes a male member having a relatively spherical head for engaging a socket in a female member, the socket being formed in a hollow member preferably integral with its body. The hollow member may be in the nature of a cap or tube which is provided with opposed cutouts or notches completely formed preferably through the material on diametrically opposite sides. A flexible, resilient locking member or spring clip, such as a continuous elliptical shaped spring member, fits over the outside of the socket member and has parts thereof receivable in the opposed notches in the socket member, so that when the male member is snapped into the female member, the spring locking member is free to flex, permitting the head of the male member to be received in the socket. The spring locking member thus will engage beneath the spherical head of the male member and lock the two parts together. The two elements constituting the snap fastener may be readily disconnected by pulling or prying the two members apart.

The primary object of the invention is the provision of a new and improved snap fastener which may be quickly and readily manufactured and assembled at an extremely low cost.

Another object of the invention consists in providing a two-part snap member which permits the spring locking member to be applied quickly, easily and economically in place, and still permits a tight locking action but allowing for quick and easy detachment.

A further object of the invention consists in providing a two-part snap fastener whereby a single resilient element may be attached quickly over a hollow female member for snap locking engagement with a male member.

Other objects and advantages will be apparent throughout the progress of the specification which will follow.

The accompanying drawing illustrates a certain selected embodiment of the invention, and the views therein are as follows:

Fig. 1 is a detail exploded view of a two-part fastener element, each element being shown in perspective;

Fig. 2 is a detail top plan view of the assembled snap fastener embodying the invention, parts being broken away for the sake of clearness;

Fig. 3 is a detail transverse sectional view on the line 3—3 of Fig. 2;

Fig. 4 is a detail perspective view of one form of locking ring embodying the invention;

Fig. 5 is a detail plan view of a locking ring of a slightly different configuration; and Fig. 6 is a detail longitudinal sectional view of a modified form of snap fastener showing the manner in which two members may be secured together by providing the opposed cutouts in the outer member and engaging the spring locking ring for snap engagement beneath the spherical head of a male member.

The particular construction herein shown for the purpose of illustrating the invention comprises a snap fastener 1, which comprises a male member 2 having interengagement with a female member 3.

The male member 2, Fig. 1, may comprise a base 4 to which an upstanding stem 5 is formed in any conventional manner, such as by extruding the same, or the stem 5 may be solid and secured to the base 4. The stem 5 terminates at its upper end in a relative spherical head 6, which is adapted to be received within a socket 7, Figs. 2 and 3, formed in a cap or hood 8, Fig. 1, or a tube, Fig. 6, preferably stamped or punched from the base 10 of the female member 3. The cap 8 is provided with oppositely disposed cutouts or side notches 9, Fig. 2, there being one cutout or notch 9 on each side of the cap 8, and these cutouts are arranged diametrically opposite to each other. The stem 5 has a restriction below the head 6.

A resilient spring clip or locking ring 11 is adapted to be applied over the cap 8, and this locking ring is preferably elliptical in shape, Fig. 2, so that its long dimension may be pressed inwardly to permit the spring clip or locking ring 11 to be applied over the cap 8, and when so applied will snap into place with its opposed side edges receivable in the opposed notches 9. Therefore, when the male member 2 is engaged with its cooperating female member 3, the spherical head 6 will be received within the socket 7, but inasmuch as the locking ring 11 is resilient, the head 6 will be free to flex the sides of the locking ring 11 outwardly to permit the spherical head 6 to engage snugly within the socket of the hood 8 and then become locked in position by means of the spring locking ring or clip 11 engaging the grooves or slots 9, Fig. 3.

The spring clip 11 is preferably elliptical in shape; that is, the space 12 defined by the ring 11 may be in the form shown in either Figs. 4 or 5, or any other configuration, just so that one dimension of the ring is greater than the other. The term "elliptical" herein used includes various shapes, such as true elliptical, or having relatively pointed ends 13 as shown in Fig. 5, or the sides of the ring may be scalloped, or embodying any other configuration, just so the ring may be snapped over the cap and engage the notches or slots 9. The body of the locking ring 11 is preferably in the form of a band being greater in height or longitudinal dimension than it is in thickness. It may be made by cutting a length from a cylinder or tube which may be made by an extrusion operation. If desired, the clip or locking ring 11, which is preferably continuous, may be a single piece of spring wire. It may be an advantage that the locking ring 11 include internal diametrically oppositely disposed protuberances 14, which extend through, and fit into, the opposed slots or notches 9 in the cap of the female member 3, and thus provide securement and prevent displacement of the ring 14 with respect to the cap 8.

The snap fastener 1 of the invention need not comprise the two snap members as shown in Figs. 1 to 3, wherein the male and female members 2 and 3 embody respective circular bases 4 and 10 for attachment to material, such as cloth, plastic, leather, or other material for use in connection with women's dresses, seat covers, curtains, or other elements. The snap fastener is adaptable for various uses and, in Fig. 6, there is shown a snap fastener embodying the invention wherein there are two cylindrical members or tubes 15 and 16 without any supporting bases. The tube 15 comprises a male member having a longitudinal hollow body 17, which terminates at its upper end in a spherical shaped head 18 and a restricted neck 19 immediately below the head.

The member 16 is a female member and comprises a longitudinal hollow body 20 terminating in an open end 21 which surrounds an internal socket 22. If desired, the body 20 may terminate in a cap like that shown in Figs. 1 to 3. The socket 22 is adapted to receive the spherical head 18 of the male member 15 and a part of the cylindrical body 17. The cap 21 has its inner diameter or socket 22 substantially equal to the outer diameter of the spherical head 18, so that the two members will fit snugly, but freely, in place. The cap 21 is provided with diametrically opposed cutouts or slots 23 which engage the narrow diameter of a spring clip or locking ring 24.

The locking ring 24 is made exactly like the locking ring 11, shown in Figs. 1 to 4. The ring 24 may be provided with inwardly extending fingers, projections or protuberances 25, like the fingers or protuberances 14, Figs. 1 to 5. The projections 25 cooperate with the slots 23 of the female member in exactly the same manner in which the protuberances 14 on the locking ring 11 cooperate with the slots 9 in the cap 8, shown in Figs. 1 to 4.

The fastener of the present invention comprises an exceedingly simple device which can be made extremely economically, and requires very few operations in assembling, and should the device be assembled by machine, the machine would be simple in construction and capable of being made at an extremely low cost. The device of the invention is adapted to be easily applied and removed, and it may be secured to cooperating parts for fastening two elements together.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

A two-part snap fastener comprising a first body having a head at its upper end, there being a restriction below the head, a second body having means defining a socket into which the head is received, said second body having slots formed on opposite sides, said slots being located in a plane coextensive with the plane of the restriction, an elliptically-shaped resilient locking ring applied over the second body with the sides of the ring extending inwardly, said ring having inner and outer surfaces, the thickness of the ring between the surfaces being uniform integral oppositely disposed protuberances extending from the inner surface of the ring and receivable in said slots, whereby the head is free to expand the ring upon insertion or withdrawal of the head with respect to the socket, said integral members engaging the slots and positioned beneath the head at the restriction to hold the parts together when the head is in its socket.

References Cited in the file of this patent

UNITED STATES PATENTS

| | | |
|---|---|---|
| 572,735 | Thompson | Dec. 8, 1896 |
| 1,059,659 | De Wolfe | Apr. 22, 1913 |
| 1,217,164 | Federman | Feb. 27, 1917 |
| 1,224,936 | Kline | May 8, 1917 |
| 2,617,165 | Stanley | Nov. 11, 1952 |

FOREIGN PATENTS

| | | |
|---|---|---|
| 50,708 | Austria | Nov. 10, 1911 |
| 79,631 | Switzerland | Dec. 16, 1918 |